United States Patent [19]

Taylor

[11] 4,036,402
[45] July 19, 1977

[54] INDUSTRIAL FUEL STORAGE AND SELF-BLENDING TANK AND METHOD

[75] Inventor: Otis Max Taylor, East Point, Ga.

[73] Assignee: TMC, Inc., Dunwoody, Ga.

[21] Appl. No.: 707,519

[22] Filed: July 22, 1976

[51] Int. Cl.² .............................................. B67B 7/24
[52] U.S. Cl. .......................................... 222/1; 222/3; 222/189
[58] Field of Search .............. 222/1, 3, 189, 4, 402.18

[56] References Cited

U.S. PATENT DOCUMENTS

| | | | |
|---|---|---|---|
| 2,279,705 | 4/1942 | Dayhuff | 222/3 X |
| 3,141,317 | 7/1964 | Segawa | 222/3 X |
| 3,970,219 | 7/1976 | Spitzer et al. | 222/189 X |

Primary Examiner—Robert B. Reeves
Assistant Examiner—Hadd Lane
Attorney, Agent, or Firm—Robert B. Kennedy

[57] ABSTRACT

An industrial fuel storage and self-blending tank comprising a container having a top, a bottom and sides forming an enclosed chamber with an outlet adjacent the container top through which gases may exit the chamber. A dip tube is mounted within the container extending from adjacent the container bottom to the container outlet. The dip tube has a lower opening in a lower portion thereof and an upper opening in an upper portion thereof providing fluid communications between the interior and exterior of the tube. A wick is mounted within the dip tube overlaying the upper opening. A valve is provided to control the flow of gases through the container outlet.

A method is also disclosed for storing and self-blending a mixture of fuels of diverse specific gravities comprising the steps of partially filling a container with the fuels in their liquid state leaving a vapor space above the surface thereof, and sealing and storing the container thereby permitting the fuel of greater specific gravity to gravitate to the bottom of the container and the fuel of lesser specific gravity to rise thereabove to the surface. Liquid fuel of greater specific gravity is drawn from adjacent the bottom of the container upwardly into a wick disposed in the vapor space above the surface of the liquid fuel. Vapors of the fuel of lesser specific gravity evaporated from the surface of the liquid fuels into the vapor space are drawn out of the container through liquid fuel of greater specific gravity in the wick within the vapor space.

6 Claims, 2 Drawing Figures

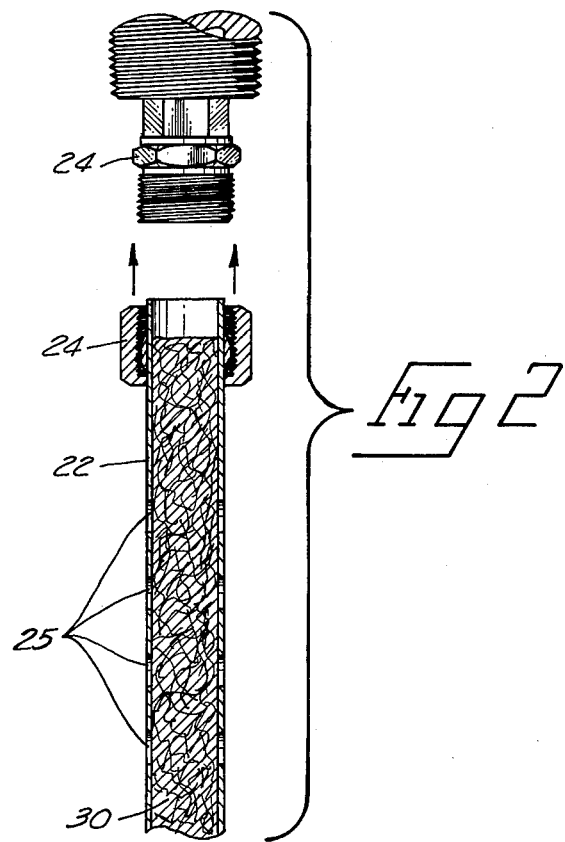

4,036,402

INDUSTRIAL FUEL STORAGE AND SELF-BLENDING TANK AND METHOD

BACKGROUND OF THE INVENTION

This invention relates generally to means and methods for storing and self-blending fuels of diverse specific gravities.

Some uses of industrial fuels require that two or more fuels be blended immediately prior to fuel consumption. For example, fuels used with flame-cutting torches today typically comprise propane or natural gas with which pentanes are blended to enhance torch flame characteristics. As additives such as these have specific gravities substantially in excess of that of the base fuels, they tend to settle to the bottom of their storage tanks. As a result the composition of the fuel at the fuel surface within the storage tank is mostly that of the base fuel. Thus, when stored within an enclosed tank for a period of time, the gases within the vapor chamber above the surface of the liquid fuel is largely only that of the less dense base fuel. Consequently, the fuels must be blended either during or immediately preceding the drawing off of these vapors for combustion in order to obtain a proper mixture at the torch.

Heretofore, blenders have been devised for blending the natural gas or propane in its gaseous state with additives in their liquid state. One such blender is disclosed in U.S. Pat. No. 3,924,648 wherein the blender comprises an enclosed chamber in which liquid additive is disposed and means for percolating natural gas or propane up through the liquid additive to create a proper blend of vapors above the surface of the liquid additive which may then be drawn out of the blender to a torch. Another such blender is described in U.S. Pat. No. 3,870,069 wherein passage of the base fuel in its gaseous state through the vapor space above the surface of liquid additive causes the additive to "boil" upwardly through and out of a dip tube in effecting a mixture. These blenders, of course, require that the base fuel be in a gaseous state, which in turn creates the need for substantially greater storage space. With some other devices both liquified base fuel and additive have been stored in a premixed state and blending effected by mechanical actions. These types of systems have, however, themselves required an energy supply for effecting the mechanical blending action, and thus have not proved to be efficient. In addition they have ordinarily left residual additive, in substantial quantities after the base fuel has been depleted. This has usually proven wasteful since reclamation is difficult and inefficient. The mixing of liquid additive to liquid base fuel has also caused many impurities carried by the base hydrocarbon fuel to solidify. When subsequently drained through the storage tank valve, they have degraded valve operation.

Accordingly, it is a general object of the present invention to provide improved methods and means for storing and self-blending fuels of diverse specific gravities.

More specifically, it is an object of the invention to provide means and methods for self-blending a liquified base fuel such as natural gas or propane with a liquified fuel additive having a specific gravity in excess of that of the base fuel.

Another object of the invention is to provide means and methods for self-blending a liquified base fuel with a liquified fuel additive by which substantially all of the liquids are depleted leaving minimal residual as waste.

Another object of the invention is to provide means and methods for storing and self-blending fuels of diverse specific gravities that are self-actuated and powered by the very act of drawing off fuel vapors from the storage tank for consumption.

Yet another object of the invention is to provide means and methods of the type described which self-filter the fuels.

Still another object of the invention is to provide means and methods for self-blending liquid fuels of diverse specific gravities of the type described which may be constructed and practiced with simplicity and economy.

SUMMARY OF THE INVENTION

In one form of the invention an industrial fuel storage and self-blending tank is provided comprising a container having a top, a bottom and sides forming an enclosed chamber with an outlet adjacent the chamber top to which gases may exit the chamber. A dip tube is mounted within the container extending from adjacent the container bottom to the container outlet. The dip tube has at least one lower opening in a lower portion thereof and at least one upper opening in an upper portion thereof providing fluid communications between the interior and exterior of the tube. A wick is mounted within the dip tube overlaying at least a portion of the upper opening. Valve means are provided for controlling the flow of gases through the container outlet.

In another form of the invention a method is provided for storing and self-blending a mixture of fuels of diverse specific gravities comprising the steps of partially filling a container with the fuels in their liquid state leaving a vapor space above the surface thereof. The container is then sealed and stored thereby permitting the fuel of greater specific gravity to gravitate to the bottom of the container and the fuel of lesser specific gravity to rise thereabove to the surface. Liquid fuel of greater specific gravity is drawn from the bottom of the container upwardwardly into a wick disposing in the vapor space above the surface of the liquid fuel. Vapors of the fuel of lesser specific gravity evaporated from the surface of the liquid fuel are drawn out of the container through liquid fuel of greater specific gravity in the wick within the vapor space.

BRIEF DESCRIPTION OF THE DRAWING

FIG. 2 is an enlarged side view, partially in cross-section, of a portion of the tank shown in FIG. 1.

DESCRIPTION OF THE PREFERRED EMBODIMENTS

Figure 1:
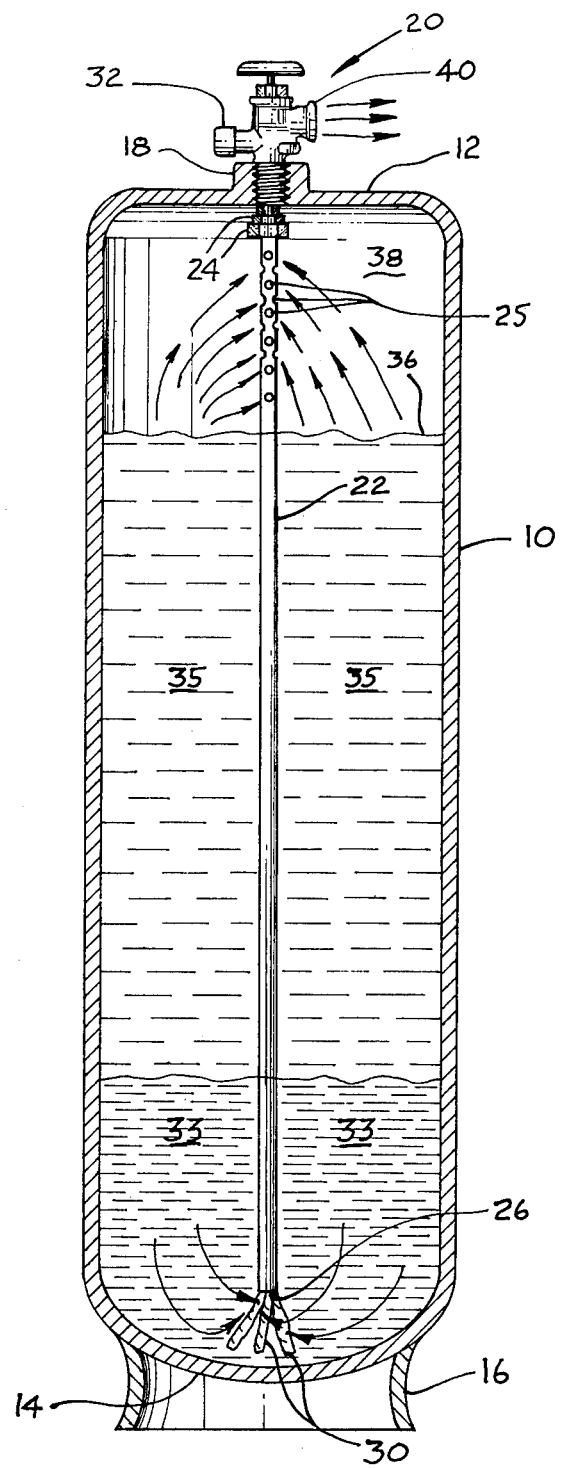
FIG. 1 is a side view, in cross-section, of an industrial fuel storage and self-blending tank embodying principles of the invention in one preferred form which may be used in practicing methods of the invention.

Referring now in more detail to the drawing, there is shown a tank in the form of a conventional cylinder commonly used today in storing various fuels in relatively small quantities. The tank has unitarily formed cylindrical steel sides 10, a top 12 and a bottom 14. A base 16 is secured as by welding to the outer surface of the bottom of the tank. A threaded outlet is provided in the neck 18 of the cylinder that projects upwardly from the cylinder top 12. A hand operated valve, such as a Type B850 sold by the Fisher Controls Company of McKinney, Tex., is mounted to the top of the cylinder with the valve base stem threadedly received within the cylinder outlet.

A copper dip tube 22 is mounted within and along the vertical axis of the cylinder in communication with the cylinder outlet. The top of the tube is mounted just beneath the outlet by a series of bushings 24 while the open bottom end 26 of the tube is positioned closely adjacent but in spaced relation with the inside surface of the cylinder bottom. The upper portion of the dip tube beneath the outlet is formed with a set of openings 25 therein providing fluid communications between the interior and exterior of the tube. A fibrous, industrial wick 30 is mounted within the dip tube extending from the top of the tube overlaying openings 25 all the way down therethrough and out the open bottom end thereof.

In use, fuels of diverse specific gravities are introduced into the tank through a self-sealing valve inlet 32, or, alternatively poured thereinto with the valve temporarily removed from the tank outlet. After the fuel has been stored for a period of time within the tank the fuel of greater specific gravity 33 settles to the bottom of the cylinder while the fuel of lesser specific gravity 35 rises thereabove. Some of the heavier fuel may be absorbed into the lighter fuel but nevertheless the fuel adjacent the surface 36 of the liquid is composed mostly of the lighter fuel. During storage with valve 20 closed in sealing the tank, fuel adjacent the surface 36 evaporates into the vapor space 38 located above the surface. The fuel of greater specific gravity 33 is drawn by wick 30 upwardly through the dip tube 22 and the fuel 35 of lesser specific gravity and into that portion of the wick overlaying the openings 25 in the upper portion of the dip tube within the bounds of the vapor space 38. When fuel is subsequently drawn from the tank through the outlet 40 of valve 20 the vapors of the lighter fuel within the vapor space are drawn into the dip tube through openings 25, and then out of the tank outlet and valve. In being so drawn into the upper portion of the tube, these vapors pass through the heavier liquid fuel within the upper portion of the wick overlaying the tube openings 25. This causes the fuel of greater specific gravity within the upper portion of the wick itself to be vaporized and blended with the vapor of the liquid fuel as it is drawn out of the tank. Simultaneously, the wick serves to filter impurities which otherwise could impair operation of the valve. The wick further serves to draw residual additive from the bottom of the tank when the tank approaches a fuel depleted state thereby inhibiting the formation of residual fuel waste.

It should be understood that the just described embodiment merely illustrates principles of the invention in one preferred form. Many modifications, additions and deletions may, of course, be made thereto without departure from the spirit and scope of the invention as set forth in the following claims:

I claim:

1. An industrial fuel storage and self-blending tank comprising: a container having a top, a bottom and sides adapted to be filled with a plurality of liquids of diverse specific gravities to a maximum liquid fill level located below said top thereby providing a vapor chamber between at least said maximum liquid fill level and said top; an outlet adjacent said container top through which vapors may controllably exit the vapor space and enclosed chamber; a dip tube mounted within said container extending from adjacent said container bottom to said container outlet and having a top portion extending upwardly from said maximum liquid fill level through said vapor space to said outlet, a bottom portion located adjacent said container bottom, and an intermediate portion extending between said bottom and top dip tube portions, said dip tube intermediate portion being impervious to the flow of liquid between the interior and exterior thereof, said dip tube bottom portion having a lower tube opening therein through which liquid may flow from the exterior to the interior thereof, and said dip tube top portion having an upper tube opening therein through which gases may flow from the exterior to the interior thereof; a wick mounted within said dip tube overlaying at least a portion of said upper tube opening; and valve means for controlling the flow of gases through said container outlet.

2. An industrial fuel storage and self-blending tank in accordance with claim 1 wherein said wick extends out of said tube through said lower opening.

3. An industrial fuel storage and self-blending tank in accordance with claim 1 wherein said tube has a plurality of vertically spaced upper openings in said top portion overlayed by said wick.

4. An industrial fuel storage and self-blending tank in accordance with claim 3 wherein said wick extends over said plurality of upper tube openings and out through said lower opening.

5. A method of storing and self-blending a mixture of fuels of diverse specific gravities comprising the steps of:
   a. paritially filling a container with the fuels in their liquid state leaving a vapor space above the surface thereof;
   b. sealing the container;
   c. storing the sealed container thereby permitting the fuel of greater specific gravity to gravitate to the bottom of the container and the fuel of lesser specific gravity to rise thereabove to the surface;
   d. drawing liquid fuel of greater specific gravity from adjacent the bottom of the container upwardly by wicking action from adjacent the bottom of the container through and out of contact with the fuel of lesser density into the wick disposed in the vapor space above the surface of the liquid fuel; and
   e. drawing vapors of the fuel of lesser specific gravity evaporated from the surface of the liquid fuels out of the container through the liquid fuel of greater specific gravity in the wick within the vapor space.

6. A method of storing and self-blending a mixture of fuels in accordance with claim 5 wherein step (d) the fuel of greater density is drawn through a filter from adjacent the bottom of the container upwardly into the wick disposed in the vapor space.

* * * * *